(12) United States Patent
Oesterle et al.

(10) Patent No.: US 10,899,347 B2
(45) Date of Patent: Jan. 26, 2021

(54) METHOD AND DEVICE FOR OPERATING A VEHICLE

(71) Applicant: Robert Bosch GmbH, Stuttgart (DE)

(72) Inventors: Florian Oesterle, Stuttgart (DE); Gian Antonio D'Addetta, Stuttgart (DE); Heiko Freienstein, Weil der Stadt (DE); Joerg Moennich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 16/091,210

(22) PCT Filed: Mar. 23, 2017

(86) PCT No.: PCT/EP2017/056997
§ 371 (c)(1),
(2) Date: Nov. 1, 2018

(87) PCT Pub. No.: WO2017/174370
PCT Pub. Date: Oct. 12, 2017

(65) Prior Publication Data
US 2019/0111920 A1   Apr. 18, 2019

(30) Foreign Application Priority Data
Apr. 5, 2016   (DE) .................. 10 2016 205 569

(51) Int. Cl.
| | | |
|---|---|---|
| *B60W 30/095* | (2012.01) | |
| *B60W 30/09* | (2012.01) | |
| *B60W 40/04* | (2006.01) | |
| *B60W 30/16* | (2020.01) | |
| *B60W 30/085* | (2012.01) | |

(52) U.S. Cl.
CPC ........ *B60W 30/095* (2013.01); *B60W 30/085* (2013.01); *B60W 30/09* (2013.01); *B60W 30/16* (2013.01); *B60W 40/04* (2013.01); *B60K 2370/175* (2019.05); *B60W 2554/80* (2020.02); *B60W 2556/65* (2020.02)

(58) Field of Classification Search
CPC .. B60W 30/095; B60W 30/085; B60W 30/09; B60W 30/16; B60W 40/04; B60W 2556/65; B60W 2554/80; B60K 2370/175
See application file for complete search history.

(56) References Cited

U.S. PATENT DOCUMENTS

2015/0149019 A1*   5/2015   Pilutti ............. G08G 1/096791
                                                       701/23
2017/0101093 A1*   4/2017   Barfield, Jr. ..... G08G 1/096775

FOREIGN PATENT DOCUMENTS

| DE | 102011080922 A1 | 2/2013 |
|---|---|---|
| DE | 102013211427 A1 | 12/2014 |
| DE | 102014202453 A1 | 8/2015 |
| DE | 102014214514 A1 | 1/2016 |
| EP | 2481650 A1 | 8/2012 |

(Continued)

*Primary Examiner* — Michael D Lang
(74) *Attorney, Agent, or Firm* — Norton Rose Fulbright US LLP; Gerard Messina

(57) ABSTRACT

A method for a vehicle, by which it is determined whether a further vehicle located in the surroundings of the vehicle is operated in an at least semi-automated manner. The method includes detecting at least one parameter of the further vehicle and determining, on the basis of the at least one parameter, whether the further vehicle is operated in an at least semi-automated manner.

16 Claims, 5 Drawing Sheets

(56) References Cited

FOREIGN PATENT DOCUMENTS

| | | | |
|---|---|---|---|
| JP | 2005201422 | A | 7/2005 |
| JP | 2009118061 | A | 5/2009 |
| JP | 2009134455 | A | 6/2009 |
| JP | 2010228740 | A | 10/2010 |
| JP | 2011259025 | A | 12/2011 |
| JP | 2012020733 | A | 2/2012 |
| JP | 2013196664 | A | 9/2013 |
| JP | 2015044432 | A | 3/2015 |
| JP | 2015102893 | A | 6/2015 |
| JP | 2015106326 | A | 6/2015 |
| JP | 2015207490 | A | 11/2015 |
| JP | 2017045385 | A | 3/2017 |
| JP | 2017079015 | A | 4/2017 |
| JP | 2019059245 | A | 4/2019 |
| WO | 2015186648 | A1 | 12/2015 |

\* cited by examiner

METHOD AND DEVICE FOR OPERATING A VEHICLE

FIELD OF THE INVENTION

The present invention relates to a device and to a method for operating a vehicle.

BACKGROUND INFORMATION

There are vehicles from the related art, in which individual driving functions may be carried out in a highly automated manner. For example, the transverse and/or longitudinal guidance may be automatedly regulated, so that only a few interventions by the driver are necessary.

SUMMARY OF THE INVENTION

The present invention relates to a method for a vehicle, by which it is determined whether a further vehicle located in the surroundings of the vehicle is operated in an at least semi-automated manner. The method includes the following steps:
  detecting at least one parameter of the further vehicle;
  determining, on the basis of the at least one parameter, whether the further vehicle is operated in an at least semi-automated manner.

The method according to the present invention offers the advantage that it may be established whether further vehicles located in the surroundings of the vehicle are operated in an at least semi-automated manner. "Operated in a semi-automated manner" means, in this case, that the transversal and/or longitudinal guidance of the further vehicle are/is carried out in an automated manner. Examples of appropriate systems are vehicle-speed controllers, lane departure warning systems, construction site assistance systems, systems such as adaptive cruise control, traffic jam assistants, etc. The further vehicle may also be operated in a highly automated or fully automated manner, however, so that the driver needs to intervene in the vehicle guidance only occasionally or not at all.

Due to the gathered information that the further vehicle is operated at least in a semi-automated manner, measures may be taken in the vehicle, for example, signals or warnings may be output or interventions in the vehicle dynamics of the vehicle may take place, which make the travel safer overall and contribute to the avoidance of accidents.

In one advantageous specific embodiment of the present invention, the vehicle is equipped with a Car2x communication module, with the aid of which at least one parameter of the further vehicle is detected.

This specific embodiment of the method offers the advantage that a determination as to whether the further vehicle is operated at least in a semi-automated manner may be very easily carried out.

Due to the detection of a parameter, in the form of a received signal in this case, which contains information regarding the degree of automation of the further vehicle, the determination as to whether the further vehicle is operated at least in a semi-automated manner may be carried out directly in the vehicle. Due to a transmission of signals including information regarding the host vehicle's degree of automation and/or a reception of information regarding the degree of automation of further vehicles, an optimized exchange of information may take place, which may contribute to the safety of all road users. The degree of automation of a vehicle indicates, in this case, whether a vehicle is operated at least in a semi-automated or highly automated or fully automated manner. If necessary, the degree of automation may also contain detailed information regarding active driving functions of the vehicles or individual systems or components which are operated or activated in an automated manner.

In one further specific embodiment of the present invention, the vehicle is equipped with a surroundings sensor system, with the aid of which at least one parameter of the further vehicle is detected.

This specific embodiment offers the advantage that the detection as to whether the further vehicle is operated at least in a semi-automated manner may also take place without a special communication tool, with the aid of which the vehicle may communicate with the further vehicle. In this case, the further vehicle does not need to actively output a signal, which describes its state, toward the outside. The detection of the degree of automation or whether the further vehicle is operated at least in a semi-automated manner may take place regardless of the configuration of the further vehicle. It is also possible to be able to draw inferences, on the basis of visual features of the further vehicle, regarding the degree of automation of the further vehicle. If a lighting device, for example, is mounted on the further vehicle, which allows inferences to be drawn regarding its degree of automation, this piece of information may be gathered and evaluated as a parameter.

It is also possible to draw inferences, on the basis of the handling characteristics of the further vehicle, regarding its degree of automation. The parameters gathered with the aid of the surroundings sensor system, may be, for example, the position, the speed, the braking or acceleration behavior, the presence or the position of a driver of the further vehicle.

The vehicle surroundings may be understood to be, for example, the detection range of the surroundings sensor system. If a Car2x communication module is installed, the surroundings may also describe a certain radius around the vehicle or freely definable areas ahead of or behind the vehicle. The extents of the areas may depend on the traffic situation and the speed.

In one advantageous specific embodiment of the present invention, at least one parameter includes a driving trajectory of the further vehicle, which is detected with the aid of the surroundings sensor system.

This specific embodiment offers the advantage that an analysis of the handling characteristics of the further vehicle may be carried out on the basis of the parameter which includes the driving trajectory. On the basis of the trajectory, inferences may be drawn regarding the degree of automation and it may therefore be ascertained whether the further vehicle is operated at least in a semi-automated manner. For example, the steering behavior or the time duration of the response of the vehicle to likewise analyzed traffic situations may be ascertained. For example, it may be ascertained how quickly a further vehicle responds to brake lights of a preceding vehicle, how great the distances are to the preceding vehicle, when a lane change takes place, how large the gaps are during a lane change, and similar details. An evaluation of these details allows inferences to be made regarding the degree of automation of the further vehicle. The ascertained trajectory may be investigated with respect to artificial or mathematical areas which are distinguished, for example, by very smooth profiles of the speed, of the steering angle, or the curve radius.

In one further specific embodiment of the present invention, the determination as to whether the further vehicle is operated at least in a semi-automated manner takes place on the basis of at least one constant acceleration and/or braking profile. This profile is ascertained on the basis of the detected driving trajectory.

This specific embodiment of the present invention offers the advantage that an analysis of the braking or acceleration profile is utilized for determining whether the further vehicle is operated at least in a semi-automated manner. A braking or acceleration profile predefined by a regulating system, which is configured for the at least semi-automated guidance of a vehicle, may differ from a profile which is typical for a human driver. An indication thereof would be, for example, a uniform acceleration or observed maximum values of the acceleration, which, for example, guarantee a certain level of comfort for the vehicle occupants.

In one further specific embodiment of the present invention, the determination as to whether the further vehicle is operated at least in a semi-automated manner takes place on the basis of at least one recurring pattern in the driving trajectory.

This specific embodiment of the present invention offers the advantage that inferences may be drawn regarding the degree of automation of the further vehicle on the basis of recurring patterns in the handling characteristics of the further vehicle. The recurring patterns may appear, for example, in repeated braking or acceleration operations which are each carried out at the same intensity or at a very similar intensity. The same applies for distances to preceding vehicles, the distance to roadway markings, vehicles located next to the further vehicle, or other boundaries of the roadway.

Responses of the further vehicle to the handling characteristics of the vehicle may also be investigated for patterns. For example, the way in which the further vehicle responds to steering, acceleration, or braking operations may be analyzed. If the vehicle as well as the further vehicle are controlled in an at least semi-automated manner, feedback in the regulation of both systems could occur in possible conflict situations arising between the vehicle and the further vehicle. This feedback may be analyzed and utilized for determining the degree of automation of the further vehicle. The feedback or patterns in the interaction of the two systems, feedback or patterns only in the system of the further vehicle, as well as feedback or patterns in the system of the host vehicle may be utilized for the determination. Repeating patterns, in which the vehicle or the further vehicle repeatedly carries out actions which have an opposing effect, may also infer the degree of automation of the further vehicle. Such patterns or comparable patterns are also referred to in the following as control loops.

One further aspect of the present invention is a method for operating a vehicle operated at least in a semi-automated manner, which includes the following steps:

detecting one further vehicle, which is operated in an at least semi-automated manner, in surroundings of the vehicle;

ascertaining a conflict and/or dangerous situation arising due to the further vehicle; and intervening in the vehicle dynamics of the vehicle as a function of the ascertained conflict and/or dangerous situation.

The method contributes to enhanced road safety in situations in which multiple semi-automatedly guided vehicles are involved. This situation may be mitigated early by way of the detection of one further vehicle, which is operated in an at least semi-automated manner and is located in surroundings of the vehicle, and the ascertainment of an arising conflict and/or dangerous situation. This takes place, according to the present invention, by way of an intervention in the vehicle dynamics of the vehicle as a function of the ascertained conflict and/or dangerous situation.

Conceivable conflict situations are, for example, situations which are not regulated in terms of traffic rights, in which, in a driving operation involving human drivers, an agreement may be reached by way of interpersonal communication, for example, in unclear right-of-way situations at an intersection, during parking, or during lane changes. Conflict situations may also occur in regulated traffic situations, however, when the objective is to plan the best possible trajectories and observe distances, which may be safe distances, between the vehicles. In this case, conflicts may arise with respect to the vehicle guidance of multiple vehicles, regardless of a traffic regulation.

An intervention in the vehicle dynamics may be implemented in different ways. Interventions in the longitudinal and/or transverse dynamics of the vehicle, braking, acceleration, adjusting a steering angle or steering torque, for example, are possible. An intervention in the vehicle dynamics of the vehicle also takes place when individual control parameters of the vehicle are changed, which contribute either to the detection of the surroundings, for example, a modified scanning rate, or to the at least semi-automated operation of the vehicle. In this way, a modification of control parameters may cause the vehicle to carry out a driving action faster or with delay. An intervention in the vehicle dynamics therefore also includes all actions of or changes to parameters, which modify the resultant driving trajectory of the vehicle.

In one advantageous embodiment of the method, the automation state of the further vehicle is determined on the basis of the above-described method for determining whether a further vehicle located in surroundings of the vehicle is operated in an at least semi-automated manner, and the further, at least semi-automatedly operated vehicle is detected.

In one advantageous specific embodiment of the method, the arising conflict and/or dangerous situation is ascertained on the basis of occurring control loops, and/or system feedback.

This specific embodiment offers the advantage that system feedback or control loops in the vehicle control of the vehicle or of the further vehicle are detected and interventions in the vehicle dynamics may be carried out on the basis of the detected system feedback or control loops. System feedback is understood to mean, in this case, repeated control operations in the system of the vehicle or of the further vehicle, which may be attributed to at least semi-automated control operations of the particular other vehicle. For example, repeating braking operations due to a braking operation of the further vehicle or repeating adaptations of the speed due to the adaptation of the speed of the particular other vehicle. Control loops are understood to be repeating patterns, in which the vehicle or the further vehicle repeatedly carries out actions which have an opposing effect or a self-enhancing effect.

In one advantageous specific embodiment of the present invention, the vehicle is operated on the basis of at least one control parameter. The intervention in the vehicle dynamics takes place on the basis of a change in the at least one control parameter.

This specific embodiment offers the advantage that a conflict or dangerous situation, which could arise due to system feedback or control loops, is mitigated or resolved by way of a change in the at least one control parameter. The at least one control parameter regulates at least one subfunction which is utilized for operating the at least semi-automatedly operated vehicle. System feedback or a control loop may be interrupted/resolved by changing the at least one control parameter, for example, a period of time between the detection of a meaningful intervention in the vehicle dynamics of the vehicle, and carrying out the intervention in the vehicle dynamics.

A change to control parameters may also be understood to be, for example, cycle time changes, the change in the scanning (for example, the position of further vehicles), the number of cycles until a control strategy becomes active (control not after every scan, but rather, for example, only after every fifth scan), the change of measuring cycles, or a change in the damping of individual control parameters. The selection of the parameters may take place in a manner comparable to a modification of parameters in the regulating technique, for example, in the case of PID controllers including proportional control units, integration components, or differentiation components. Changes of control parameters are also possible, which intervene in the transverse and/or longitudinal dynamics of the vehicle. For example, speeds, acceleration values, steering torques, or steering angles or distances to objects located on the side or objects located ahead of the vehicle may be changed.

In one advantageous specific embodiment of the method, the change of the at least one control parameter takes place in such a way that the control parameter is replaced by a randomly selected, new control parameter from a defined control parameter space.

This specific embodiment further makes it possible to resolve system feedback or a control loop. Due to a random selection of the control parameter from a previously meaningfully defined control parameter space, the situation may be avoided in which the systems implement the same change of the control parameters for the at least semi-automated control of the vehicles. If the control parameters in the vehicles were to change identically, this could result in further system feedback or control loops.

A replacement of the control parameter is understood, in this case, to mean that the parameter is modified. For example, an arbitrary control parameter from the control parameter space may be utilized, in order to replace the previous control parameter. Just as easily, a random value may be added to the previous control parameter or may be subtracted from the control parameter, or the previous control parameter may be multiplied with a random value. It may also be established, of course, whether a control parameter is to be higher or lower. The exact values may then be randomly ascertained. The value of the control parameter, which has been newly obtained in this way, should be locatable in the previously defined control parameter space after having been modified, however. The control parameter space may be made up, for example, of an upper limit/barrier and a lower limit/barrier. The randomness of the new value may be achieved in different ways. Common algorithms for generating a random number from a defined interval may be utilized for implementing this method.

According to the present invention, a method for preparing an activation of a restraint system of a vehicle is also claimed. The activation of the restraint system is prepared when an at least semi-automatedly operated further vehicle is detected in surroundings of the vehicle.

This specific embodiment offers the advantage that the safety of the vehicle occupants of the vehicle is enhanced. When an at least semi-automatedly operated further vehicle is present, the at least one restraint system present in the vehicle is prepared in such a way that the restraint system may be utilized in the event of an accident in a way which is best adapted to the situation.

In one advantageous embodiment of the method, the at least semi-automatedly operated further vehicle is detected on the basis of the above-described method for determining whether a further vehicle located in surroundings of the vehicle is operated in an at least semi-automated manner.

In one further specific embodiment of the present invention, the preparation of the activation of the restraint system takes place by way of a change in the number of threshold values and/or a raising or lowering of threshold values and/or an activation of reversible and/or irreversible actuators and/or an increase in pressures in braking and/or steering systems.

Such a preparation may be, for example, a modification of triggering thresholds in airbag triggering algorithms. The same applies for algorithms for triggering seat belt tighteners, for intervention in the vehicle dynamics (for example, ESP), or for positioning the driver (belt, active seat, etc.). It is also conceivable to adapt pressures in the vehicle, which are useful, for example, for controlling the steering, the ESP, or further actuators. It is also conceivable that reversible restraint systems such as electric seat belt tighteners are activated.

According to the present invention, a control unit is also claimed, which is configured for carrying out at least one of the methods according to the present invention or at least one of the specific embodiments thereof.

One further aspect of the present invention is a computer program which is configured for carrying out at least one of the methods according to the present invention or at least one of the specific embodiments thereof One further aspect of the present invention is a machine-readable memory medium, on which the computer program of the present invention is stored.

DETAILED DESCRIPTION

Figure 1:
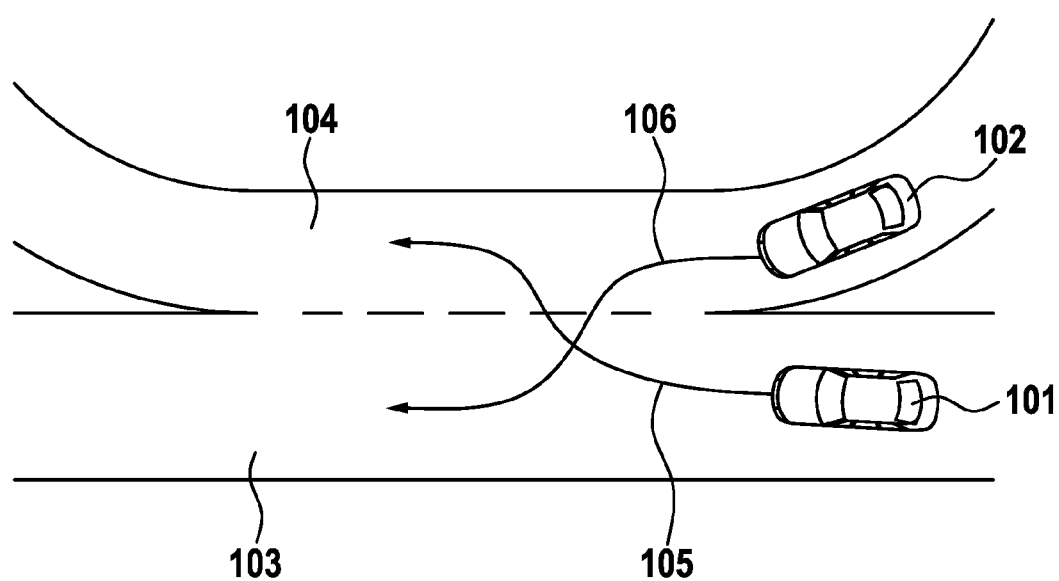
FIG. 1 shows a possible conflict or dangerous situation between two vehicles.

In FIG. 1, an exemplary embodiment is shown, in which a vehicle 101 and one further vehicle 102 are traveling in two different lanes 103, 104. Both vehicles 101, 102 are operated in an at least semi-automated manner, so that the longitudinal and transverse guidance is controlled in an automated way. In this example, vehicle 102 would like to enter an expressway along route 106, by way of example. Vehicle 101 would like to exit the expressway along route 105.

In this exemplary embodiment, a right-of-way regulation is not recognized by any system of the two vehicles 101, 102, which is responsible for the at least semi-automated guidance of particular vehicle 101, 102, so that both vehicles 101, 102 attempt to resolve the situation in such a way that the response by the particular other vehicle 101, 102 is dealt with. If the control settings in the two systems are identically or very similarly programmed, it is possible that system feedback could occur. For example, both vehicles 101, 102 could accelerate or decelerate in order to move ahead of or behind other vehicle 101, 102. If both vehicles 101, 102 carry out these changes in movement at the same time, a lane change might not take place and vehicles 101, 102 would come to a standstill at the end of the roadway sections in which a lane change is possible, or would continue traveling in their lane 103, 104, respectively.

Figure 4:
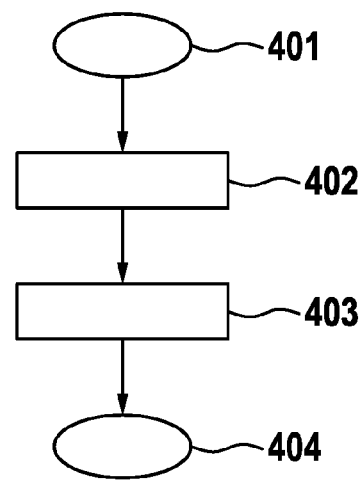
FIG. 4 shows a method diagram for detecting a vehicle.

Due to the method implemented in vehicle 101, a comparable scenario may be prevented. Vehicle 101 detects early that further vehicle 102 is an at least semi-automated vehicle 102. This is ascertained by carrying out the method represented in FIG. 4:

The method starts in step 401. In next step 402, at least one parameter of further vehicle 102 is detected by vehicle 101. In this exemplary embodiment, vehicle 101 is equipped with a surroundings sensor system, with the aid of which the driving trajectory of further vehicle 102 is recorded. Initially, this trajectory is investigated with respect to constant acceleration or braking profiles. These also include accelerations of 0 m/s$^2$, i.e., constant speeds of further vehicle 102. If it is established in this investigation that the accelerations are approximately constant over a certain period of time which may lie in the range of milliseconds or even minutes, this suggests that there is an automatic guidance of the vehicle in the longitudinal direction.

Alternatively or in addition to the investigation of the trajectory with respect to constant acceleration profiles, the trajectory is investigated for recurring patterns. In this case, regularities are sought, such as a recurring braking or acceleration pattern having very similar or identical acceleration values. Moreover, the way in which further vehicle 102 responds to external influences, for example, to additional vehicles or to the reactions of vehicle 101, may be investigated. For this purpose, the behavior of the additional vehicles may be ascertained with the aid of the surroundings sensor system, for example, the illumination of brake lights of the vehicle ahead of further vehicle 102, and the response of further vehicle 102 to this behavior (on the basis of its trajectory) may be analyzed. It would also be conceivable to ascertain the distance of further vehicle 102 to vehicle 101 or additional vehicles, in the longitudinal direction and in the transverse direction. With the aid of the at least one detected parameter or all gathered indications/pieces of information, a reliable determination takes place in step 403 as to whether further vehicle 102 is operated at least in a semi-automated manner. The method ends in step 404.

In another exemplary embodiment, vehicle 101 is equipped with a Car2x communication module. With the aid thereof, at least one parameter of further vehicle 102 is received in step 402. With the aid of this parameter, it is determined in step 403 whether further vehicle 102 is operated in an at least semi-automated manner. The determination takes place, in this example, based on an evaluation of the parameter received via the communication module. This parameter contains information regarding the degree of automation of further vehicle 102, so that the functions of further vehicle 102 which are operated in an automated manner may be very easily ascertained. The method ends in step 404.

Figure 6:
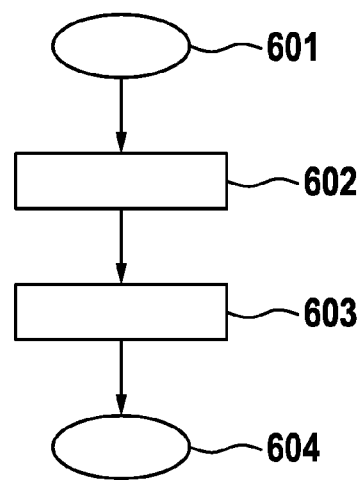
FIG. 6 shows a method diagram for preparing restraint systems.

In order to enhance the safety of the vehicle occupants, vehicle 101 is equipped with a restraint system and the method represented in FIG. 6 is carried out in vehicle 101. The method starts in step 601.

In step 602, further vehicles 102 which are operated in an at least semi-automated manner are sought in the surroundings of vehicle 101. The detection of further vehicles 102 may take place according to the method represented in FIG. 4.

If at least one further vehicle 102, which is operated in an at least semi-automated manner, is detected in the surroundings of vehicle 101, a preparation of an activation of the restraint system takes place in step 603. This may take place, for example, in the form of a change in triggering thresholds or the adaptation of pressures for braking or steering operations. The triggering of reversible or irreversible restraint systems is conceivable. The method ends in step 604.

Figure 5:
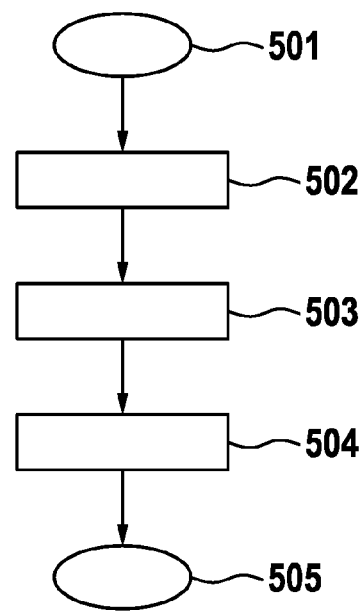
FIG. 5 shows a method diagram for intervening in the vehicle dynamics.

The method represented in FIG. 5 is also carried out in order to avoid a dangerous or conflict situation in vehicle 101, which possibly results from FIG. 1. This starts in step 501.

In step 502, the at least semi-automated vehicle 102 is detected in the surroundings of vehicle 101. The detection may take place, for example, with the aid of the method represented in FIG. 4.

In step 503, it is ascertained whether a dangerous and/or conflict situation may occur or has already occurred due to further vehicle 102. For this purpose, the handling characteristics of further vehicle 102 are investigated in greater detail, for example, in the form of the analysis of its trajectory which is recorded with the aid of the surroundings sensor system of vehicle 101. If it is established, for example, that unusual system feedback is occurring or control loops are forming, there is a conflict situation. System feedback and control loops may occur in further vehicle 102 and in vehicle 101 and are detected in each case (by analyzing the handling characteristics of vehicle 101 and of further vehicle 102 on the basis of its trajectory).

In the situation represented in FIG. 1, for example, both vehicles 101 and 102 could simultaneously accelerate or decelerate in order to pass particular other vehicle 101, 102 or to tuck in behind vehicle 101, 102. In order to actually overtake particular other vehicle 101, 102, the control systems could escalate one another, so that an excessively long or strong acceleration would occur. The same could take place in a deceleration operation, in which both vehicles 101, 102 would come to a standstill at the end.

This type or comparable types of system feedback or of the occurrence of control loops is/are ascertained in step 503, whereupon, in step 504, at least one control parameter, which is utilized in vehicle 101 for the at least semi-automated operation, is modified. The modification of the control parameter may take place, for example, in the form of a raising or lowering of the control parameter. In this exemplary embodiment, the value of the control parameter is randomly changed with a new value from a predefined control parameter space. As a result, no feedback or control loops occur even in the case of two identical control systems, since the control parameters change differently in each case. An arbitrary number of control parameters may also be modified, or the number of control parameters may be modified.

Exemplary control parameters could be the response times of the system to the at least semi-automated guidance of the vehicle. Response times may be the time ranges between the detection of a situation which requires a response and the implementation of this response. For example, the recognition that vehicle 101 should accelerate in order to overtake vehicle 102. If the control parameter, according to which, the response is to take place, is modified in vehicle 101, vehicle 102 would accelerate earlier. Before vehicle 101 would implement the response, a check of the new situation could be carried out once more. This would yield the result that a deceleration, rather than an acceleration, would be meaningful in order to change the lane. Therefore, the conflict situation would be resolved.

Due to the modification of the at least one control parameter in step 504, an intervention in the vehicle dynamics of vehicle 101 simultaneously takes place, for example, by way of a time-delayed acceleration, by way of a wait, or by way of an early steering intervention. The intervention in the vehicle dynamics of vehicle 101 does not need to take place directly by way of the change of the control parameter. Instead, the intervention may also result from a modified piece of information resulting from the change. If, for example, the scanning for the detection of the surroundings is modified, a better assessment of the traffic situation is possible, whereby a possibly new control strategy is utilized, which would have resulted from the control strategy in the case of an unmodified scanning. As a result, an intervention in the vehicle dynamics of vehicle 101 is also carried out. The method ends in step 505.

Figure 2:
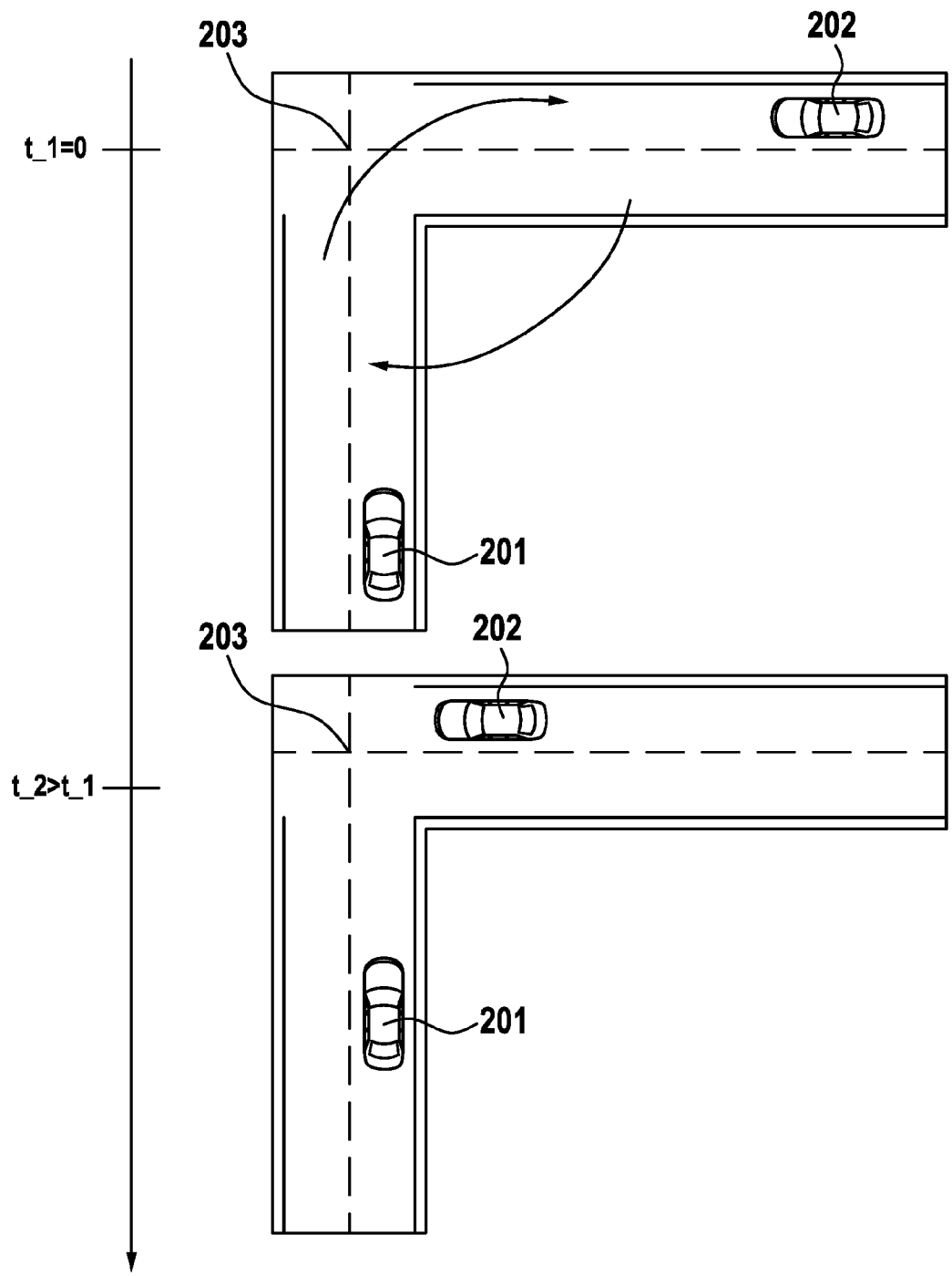
FIG. 2 shows a possible conflict or dangerous situation between two vehicles.

One further possible dangerous or conflict situation is represented in FIG. 2. The upper image shows vehicle 201 and further vehicle 202 at point in time t_1. Both vehicles 201, 202 are traveling toward an intersection 203 in an at least semi-automated manner at a similar speed. If both vehicles 201, 202 would maintain their speeds, vehicles 201, 202 would collide at intersection 203. Vehicle 201 as well as further vehicle 202 could mitigate the situation by way of a controlled application of the brakes and avoid a collision. Therefore, both vehicles 201, 202 reduce their speed by approximately the same value. Consequently, vehicles 201, 202 are still on a collision course.

In the next step, both vehicles 201, 202 would possibly carry out a similar adaptation of the speed again, whereby the conflict situation would continue to exist. Finally, vehicles 201, 202 would either collide at intersection 203 or regulate one another to a standstill.

Due to the three methods according to the present invention, which are implemented in vehicle 201, vehicle 201 recognizes at an early point in time, however, that further vehicle 202 is operated in an at least semi-automated manner. A preparation of the restraint systems installed in vehicle 201 therefore takes place as a precautionary measure. In this case, some thresholds for the detection of a frontal crash and/or a lateral crash are lowered, so that the restraint systems are activated in a timely manner in the case of a collision.

In addition, vehicle 201 detects that the systems of vehicle 201 and of further vehicle 202 down-regulate one another and system feedback occurs. Consequently, vehicle 201 therefore changes control parameters. Vehicle 201 shortens the time period to the next change in its speed and implements the change with a greater delay. The precise shortening of the time period/cycle time and the intensity of the increase in the delay are randomly selected from a predefined value range in this case, so that different changes may be implemented with great likelihood when control parameters in further vehicle 202 are also changed and, therefore, no further system feedback occurs.

In the lower image in FIG. 2, vehicles 201, 202 are shown at point in time t_2>t_1. The conflict situation has been resolved due to the change in the control parameters in vehicle 201. In further vehicle 202, it was recognized that intersection 203 may be safely crossed before vehicle 201 by increasing its speed. Consequently, further vehicle 202 arrives at intersection 203 substantially earlier and may cross intersection 203 without the risk of colliding with vehicle 201.

Figure 3:
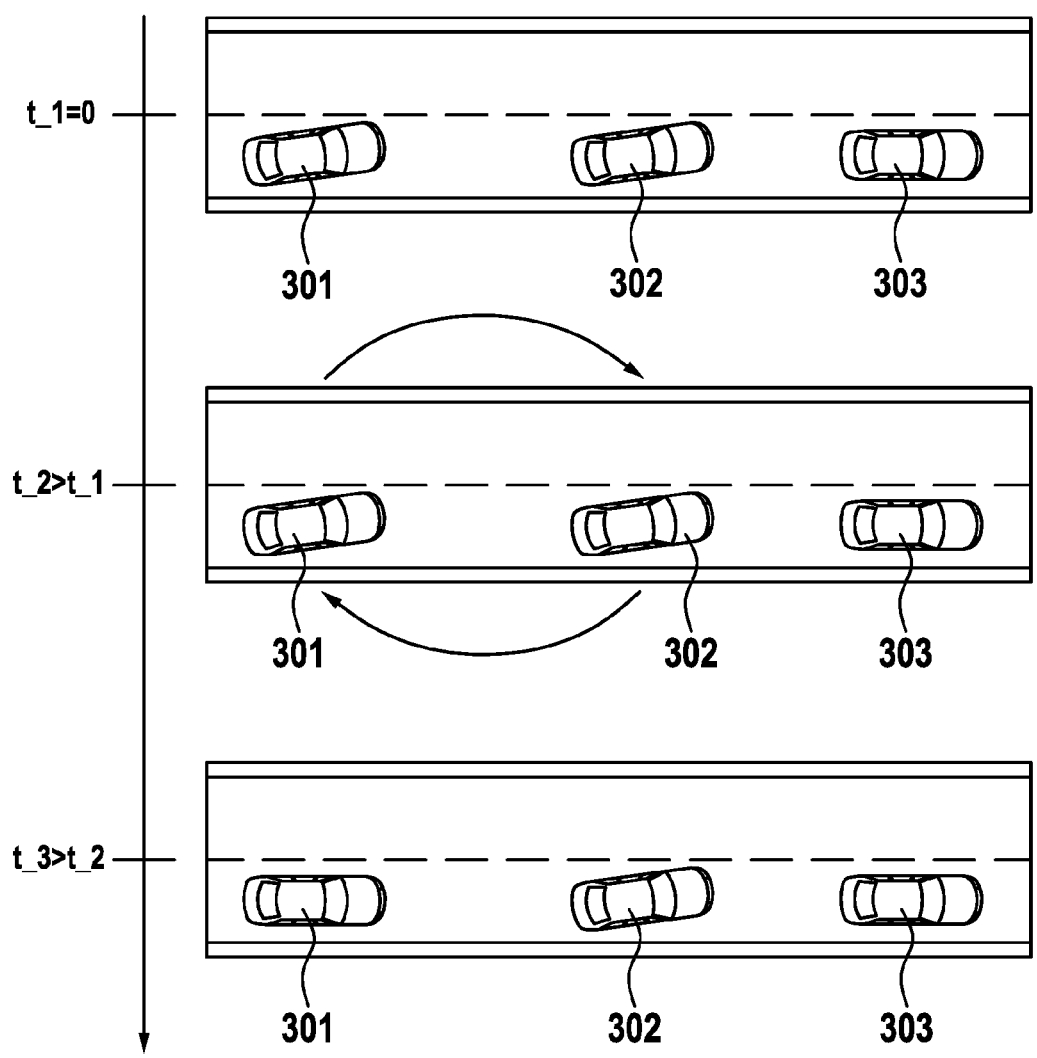
FIG. 3 shows a possible conflict situation between two vehicles.

One further possible conflict situation is represented in FIG. 3. Vehicle 301 travels behind further vehicle 302 which, in turn, is located behind an additional vehicle 303. Vehicle 301 as well as further vehicle 302 signal, at point in time t_1, that they would like to pass further vehicle 302 and additional vehicle 303, respectively. The at least semi-automatedly operated vehicle 301 as well as the at least semi-automatedly operated vehicle 302 detect, at point in time t_2>t_1, that other vehicle 301, 302, respectively, is also signaling a passing intent. Both vehicles 301, 302 therefore abort their passing maneuvers and continue to travel in their lane. After the same cycle time, both vehicles 301, 302 signal their passing intent again, but detect once again that particular other vehicle 301, 302 would also like to pass, and they abort their passing maneuvers.

Due to the method implemented in vehicle 301, vehicle 301 detects, on the basis of the arising system feedback and the control loop, that further vehicle 302 is operated in an at least semi-automated manner and, therefore, adapts its control parameters. In vehicle 301, the period of time is increased, after which a passing intent is to be signaled again.

At point in time t_3>t_2, further vehicle 302 signals a passing intent again. Since the period of time in vehicle 301 has increased, vehicle 301 still does not signal a passing intent at point in time t_3. Instead, vehicle 301 merely detects a passing intent of further vehicle 302. The planned passing maneuver of further vehicle 302 is therefore not interrupted by a detected a passing intent of vehicle 301, and further vehicle 302 may pull out in order to pass additional vehicle 303.

What is claimed is:

1. A method for a first vehicle, the method comprising:
   detecting, by the first vehicle, at least one parameter of a second vehicle that is in surroundings of the first vehicle;
   determining, based on the at least one parameter, that the second vehicle is operated in an at least semi-automated manner; and
   in response to the determination that the second vehicle is operated in the at least semi-automated manner, selecting a modification to an operation of the first vehicle on a random basis.

2. The method of claim 1, wherein the first vehicle is equipped with a Car2x communication module, and wherein the at least one parameter of the second vehicle is detected with the aid of the communication module.

3. The method of claim 1, wherein the first vehicle is equipped with a surroundings sensor system, and wherein the at least one parameter of the second vehicle is detected with the aid of the surroundings sensor system.

4. The method of claim 3, wherein the at least one parameter includes a driving trajectory of the second vehicle, which is detected with the aid of the surroundings sensor system.

5. The method of claim 4, wherein the determination as to whether the second vehicle is operated in the at least semi-automated manner occurs based on at least one constant acceleration and/or braking profile which is ascertained based on the detected driving trajectory.

6. The method of claim 4, wherein the determination as to whether the second vehicle is operated in the at least semi-automated manner occurs based on at least one recurring pattern in the driving trajectory.

7. The method of claim 1, wherein the selecting of the modification is performed without communication between the first and second vehicles of any planned changes to the operation, and is instead performed unilaterally by the first vehicle by performing a random selection of one of a plurality of predefined modifications.

8. A method for operating an at least semi-automatedly operated first vehicle, the method comprising:
- detecting that a second vehicle that is in surroundings of the first vehicle is operated in an at least semi-automated manner;
- in response to the second vehicle having been detected to be operated in the at least semi-automated manner:
  - predicting a conflict and/or dangerous situation arising due to the second vehicle being operated in the at least semi-automated manner; and
  - intervening in the vehicle dynamics of the vehicle as a function of the ascertained conflict and/or dangerous situation.

9. The method of claim 8, wherein the operation of the second vehicle in the at least semi-automated manner is detected by detecting at least one parameter of the second vehicle.

10. The method of claim 8, wherein the arising conflict and/or dangerous situation is ascertained based on predicted matching responses by both the first and second vehicles.

11. The method of claim 8, wherein the intervening is performed by a random change of a control parameter.

12. The method of claim 11, wherein the random change of the control parameter occurs so that the control parameter is replaced by a randomly selected, new control parameter from a defined control parameter space.

13. A method for preparing an activation of a restraint system of a first vehicle, the method comprising:
- detecting that a second vehicle that is in surroundings of the first vehicle is operated at least semi-automatedly; and
- in response to the detection that the operation of the second vehicle is at least semi-automated, preparing the activation of the restraint system of the first vehicle.

14. The method of claim 13, wherein the at least one semi-automatedly operation of the second vehicle is detected by detecting at least one parameter of the second vehicle.

15. The method of claim 13, wherein the preparation of the activation of the restraint system occurs by: (i) a change in a number of threshold values and/or a raising or lowering of the threshold values, and/or (ii) an activation of reversible actuators and/or irreversible actuators, and/or (iii) an increase in pressures in a braking system and/or a steering system.

16. A control unit for a first vehicle, the control unit comprising:
- a controller configured to perform the following:
  - detecting, by the first vehicle, at least one parameter of a second vehicle that is in surroundings of the first vehicle;
  - determining, based on the at least one parameter, that the second vehicle is operated in an at least semi-automated manner; and
  - in response to the determination that the second vehicle is operated in the at least semi-automated manner, selecting a modification to a an operation of the first vehicle on a random basis.

* * * * *